March 26, 1935.   J. C. BAKER ET AL   1,995,914
METHOD AND APPARATUS FOR TREATING WATER
Filed March 2, 1932   2 Sheets-Sheet 1

INVENTORS
John C. Baker
BY  Gerald D. Pat
Arthur L. Keith ATTORNEY

Patented Mar. 26, 1935

1,995,914

UNITED STATES PATENT OFFICE 1,995,914

METHOD AND APPARATUS FOR TREATING WATER

John C. Baker and Gerald D. Peet, Montclair, N. J., assignors to Wallace & Tiernan Company, Inc., Belleville, N. J., a corporation of New York Application March 2, 1932, Serial No. 596,276

5 Claims. (Cl. 210—28)

This invention relates to the treatment of flowing water, and has been made especially with the idea of providing an improved method and apparatus for introducing a sterilizing agent, such as chlorine, supplied as a gas into the water to be treated which is highly efficient and which avoids many disadvantages and difficulties of methods and means heretofore employed for this purpose.

The invention comprises a method wherein a controlled flow of chlorine gas or other gaseous treating agent is drawn into a minor flow of water flowing through an injector and is mixed with the water of the minor flow and then immediately and forcibly discharged into the main flow of water to be treated, whereby the gas mixed in the minor flow of water in a finely divided state is carried at a relatively high velocity into the main flow of water and is distributed therein almost instantaneously so that a very thorough distribution and diffusion of the gas in the water is effected before there has been time for reaction between the chlorine and matter in the minor flow. Highly efficient and rapid sterilization is thus secured. The invention also comprises apparatus for carrying out the method.

In the use of chlorine for sterilizing flowing water and sewage, it has been the practice to introduce the chlorine into the water by either the direct feed method, in which the chlorine is introduced into the water as a gas through a diffusing device, or by the solution feed method, in which gas is first introduced into a minor flow of water and then this minor flow after the gas has been dissolved therein to form a solution is discharged into the main flow of water to be treated. The advantage of the direct feed method is that the sterilizing effect of the chlorine is obtained immediately on the water of the main flow without loss of efficiency due to reaction of the chlorine on impurities in the minor flow. The direct feed method has, however, serious disadvantages. The formation of chlorine ice or hydrate at the diffuser causes much difficulty when low temperatures occur in the water being treated; the diffusers become clogged by impurities; it is frequently difficult to obtain the necessary submergence of the diffuser in the water to be treated so that all the gas will be absorbed; and the method requires the supply of chlorine gas under pressure. Supplying the gas under pressure has the disadvantage that there is danger of flooding the gas control equipment when the device is shut down due to absorption of gas remaining in the line to the diffuser and by reaction of the gas with the material of the tubing, so that water is liable to be sucked back into the tubing and to the control apparatus. There is also the danger with this direct feed method, when the water to be treated is under pressure, that the pressure will force the water back up into the control apparatus when the device is shut down.

The solution feed method has the advantages that difficulties due to the clogging of diffusers by impurities or by the formation of hydrate are eliminated, and that the necessity of supplying chlorine gas under pressure is avoided. The gas control apparatus may be of the so-called vacuum type in which gas passing through the control apparatus at about atmospheric pressure is sucked into the minor flow by a suction device through which the minor flow passes. Danger of flooding the control equipment is thus avoided. A further advantage of the solution feed method is that when the minor flow is discharged under considerable pressure into the main flow of water a very thorough mixing of the chlorine containing minor flow with the main flow is secured. This method has the serious disadvantage, however, that due to reaction between the chlorine and impurities in the water of the minor flow a very considerable amount of chlorine enters into combination or is changed to an inactive form before the minor flow is discharged into the main flow of water to be treated. This loss of chlorine increases with increase in the amount of organic matter or other impurities in the minor flow, and to avoid excessive loss of chlorine in this way, it has been necessary to use comparatively pure water for the minor flow. This has made it desirable in most cases in the treatment of sewage or other very impure water by the solution feed method to provide the minor flow of water from a source other than the main flow of water or sewage being treated.

The present invention provides a method of introducting chlorine into flowing water which combines the advantages of both the direct feed method and the solution feed method without the disadvantages of either of the old methods.

According to the present invention, the chlorine gas supplied at the desired rate from any suitable control apparatus is introduced into a minor flow of water, immediately mixed thoroughly with the minor flow, and immediately and forcibly discharged into the main flow of water to be treated. The chlorine is thus diffused in the water to be treated while mostly still in the gaseous state and very finely subdivided and before there has been time for any appreciable loss of active chlorine through combination with impurities in the minor flow. Thorough and quick distribution in the water to be treated, as in the solution feed method, is thus secured, but the loss due to chemical reaction with the minor flow in the time required under the old method for obtaining complete solution of the chlorine gas in the minor flow is practically entirely eliminated, and yet, because of the thorough quick mixing of the gas in the minor flow and the immediate and forcible discharge into the water to be treated, complete absorption of the gas in the water is secured and all difficulty due to escape of undissolved gas from the water is avoided even when the submergence of the point of discharge of the minor flow into the main flow of water is comparatively small. Because of the negligible loss of chlorine before its introduction into the water to be treated, the new method is especially adapted for the treatment of sewage and other highly impure waters, making it possible, instead of providing water from a separate source of the minor flow, to divert water from the main flow for this purpose. This possibility of using for the minor flow a portion of the fluid to be treated is in some cases of very great importance, especially where water is scarce and expensive.

It is an important advantage of the invention that chlorine or other treating gas need not be supplied under pressure, although the invention in its broader aspect is not limited to having the gas at a sub-atmospheric pressure when it enters the minor flow. The gas may be supplied by a control apparatus of the pressure type. Most desirably, however, the control apparatus used is one from which the gas flow is at a sub-atmospheric pressure and the gas is sucked into the minor flow as it passes through an injector from which the minor flow and the entrained gas is discharged into the main flow.

A full understanding of the invention can best be given by a detailed description of an apparatus for practicing the method and embodying apparatus features of the invention, and such a description will now be given in connection with the accompanying drawings, in which:—

Figure 1:
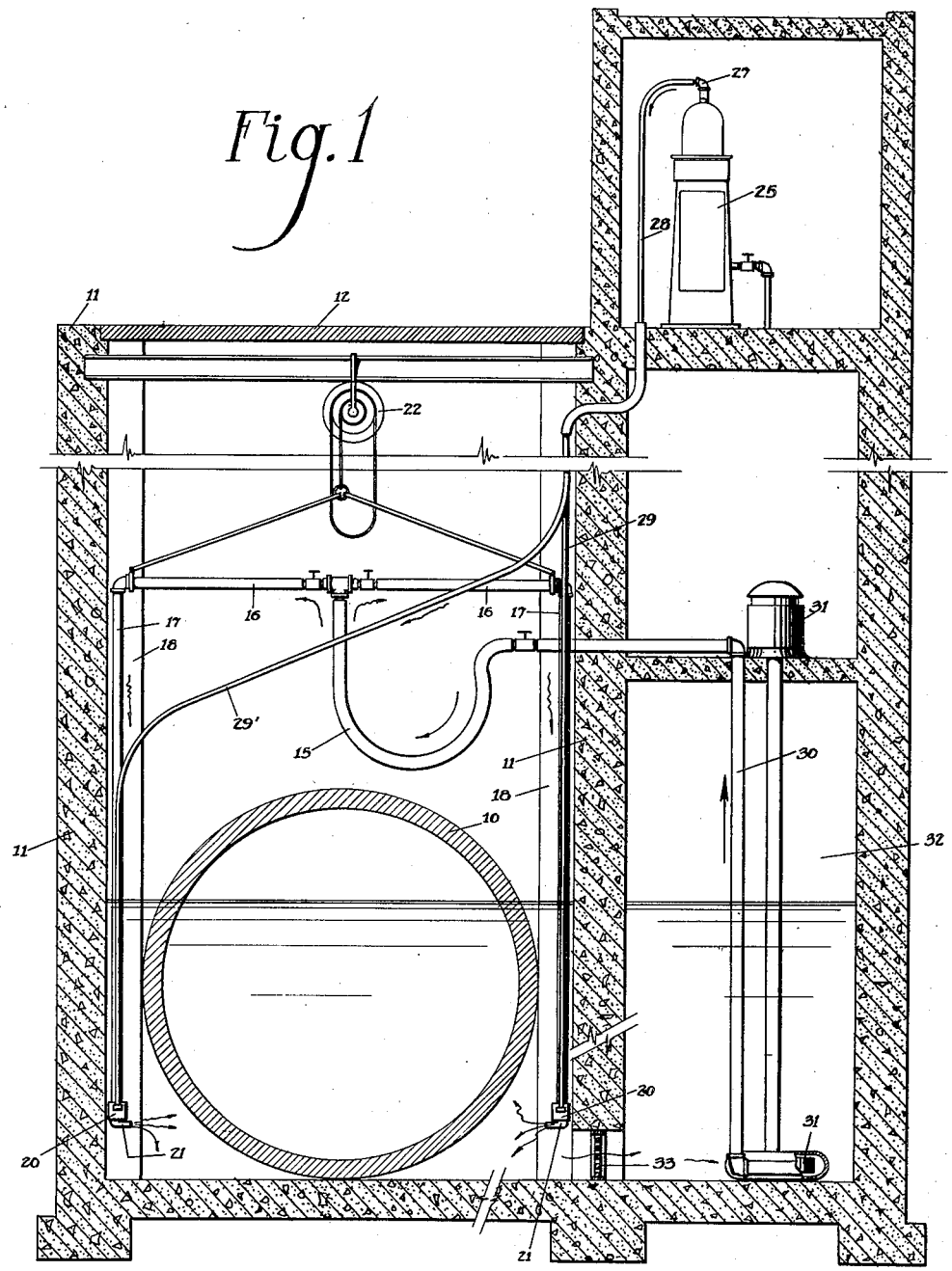
Fig. 1 is a view showing in cross-section an interposed manhole chamber of a sewer, and showing also in elevation apparatus for introducing chlorine gas into the water flowing through the sewer.
Figure 2:
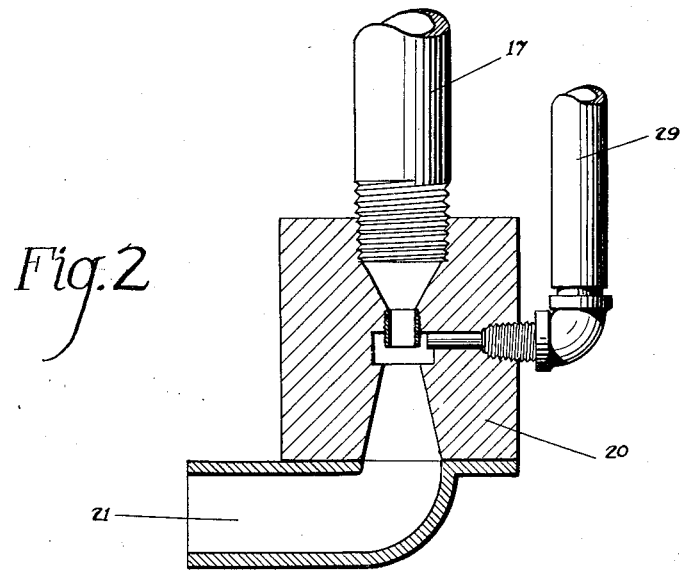
Fig. 2 is a sectional view of one of the injectors shown in Fig. 1.

Referring to the drawings, and first to Figs. 1 and 2, the treating apparatus is shown as arranged for introducing chlorine into sewage or other water flowing through a sewer 10, the discharge members of the apparatus being located in a manhole chamber interposed in the sewer conduit having walls 11 which extend upward to a manhole which is normally closed by a cover plate 12. Apparatus such as shown in this figure might be installed in any similar chamber or well, as a screen chamber or gate-well such as are commonly built into sewer lines. The minor flow of water is supplied through a flexible pipe 15 to a pipe 16 which extends across the manhole chamber and from the ends of which pipes 17 extend downward in vertical channels or recesses 18 formed in the chamber walls 11. Each of the pipes 17 carries at its lower end an injector 20, the discharge nozzle or outlet 21 of which, when the injectors are in operating position is below the liquid level in the sewer and directed to discharge into the liquid, usually in a horizontal or substantially horizontal direction and either directly across the flow of the liquid or up-stream or down-stream, as may be found to give the maximum distribution and efficiency. To provide for convenient access to the injectors, the cross pipe 16 which carries the pipes 17 is in the construction shown suspended from a differential pulley 22 suitably supported at the top of the manhole. The pipes may thus be raised by means of this pulley to lift the injectors out of the liquid and to a position where they are conveniently accessible.

The chlorine gas to be introduced into the sewage may be supplied at the desired rate from any suitable control apparatus. The control apparatus is most desirably one in which the chlorine gas, supplied from a suitable source of supply under pressure, such as the usual cylinders of liquefied chlorine, is reduced to substantially atmospheric pressure and a suction device is depended on for drawing the gas from the control apparatus. It may be, and the drawings are intended to show, an apparatus of the kind disclosed by the patent of Wallace, No. 1,514,939, with the aspirator omitted, however, and the chlorine discharge tube leading directly from the water column device by which, as fully explained in said patent, a constant negative pressure is maintained on the suction side of the suction device. The slight amount of water which may join the gas as it flows from the water column device of this control apparatus is not sufficient to cause any such loss of chlorine as need be given consideration. As stated, the particular kind or type of control apparatus forms no part of the present invention, and the control apparatus shown for the purpose of illustration and which is fully described in said Wallace patent, need therefore not be further described here. Other forms of vacuum supply apparatus by which no water is added to the gas flow may of course be used.

The control apparatus 25 may be located at any convenient place reasonably near the discharge apparatus. The gas from the control apparatus passes through a tube 27 and through a flexible tube 28 to a vertical tube 29 which extends downward in one of the channels 18 and from which a branch 29' extends across the manhole chamber and then down in the channel 18 on the other side of the chamber. The lower ends of the tubes 29 and 29' are connected each to one of the injectors 20 so that when the injector is in operation a partial vacuum will be established in the gas supply tube and the gas supplied by the control apparatus will be drawn into the injector and discharged with the minor flow into the water flowing through the sewer. The gas tubes 29 and 29' are raised and lowered with the water tubes and the injectors.

The minor flow of water may be supplied from any suitable source of supply, but should be under suitable pressure to secure the desired operation of the injectors and forcible discharge into the main flow. It is, however, as has been pointed out, an advantage of this invention that a portion of the main flow of water to be treated, even when this is sewage, may be used for the minor flow. Such an arrangement is shown in Fig. 1. As here shown, the liquid is forced by a pump 31 driven by a motor 31' up through a pipe 30 from a chamber 32 into which liquid flows from the sewer 10 through a screened outlet 33 from the sewer. The pipe 30 is connected to the flexible pipe 15. The connection 33 should most desirably be made to the sewer at a point up-stream from the injectors.

The injector or injectors may be of any suitable design to serve as a suction device when the gas is not supplied under pressure, and to discharge the minor flow of water and the entrained gas forcibly into the water being treated. A Venturi type of injector such as shown by Fig. 2 is most desirably used.

The minor flow passing through the injector sets up a partial vacuum at the injector throat. This results in a suction on the gas tube which is connected to the injector throat and the gas is thereby drawn into the injector. If a pressure type of chlorine control apparatus is used, gas will flow into the injector throat under pressure. In either case, the gas entering the injector will be immediately thoroughly mixed with the minor flow and the turbulent mixture of minor flow liquid and gas will be immediately and forcibly discharged through the discharge outlet 21 of the injector into the main body of water to be treated. This will, as stated, result in a very rapid and very complete diffusion of the treating agent in the main flow.

Figure 3:
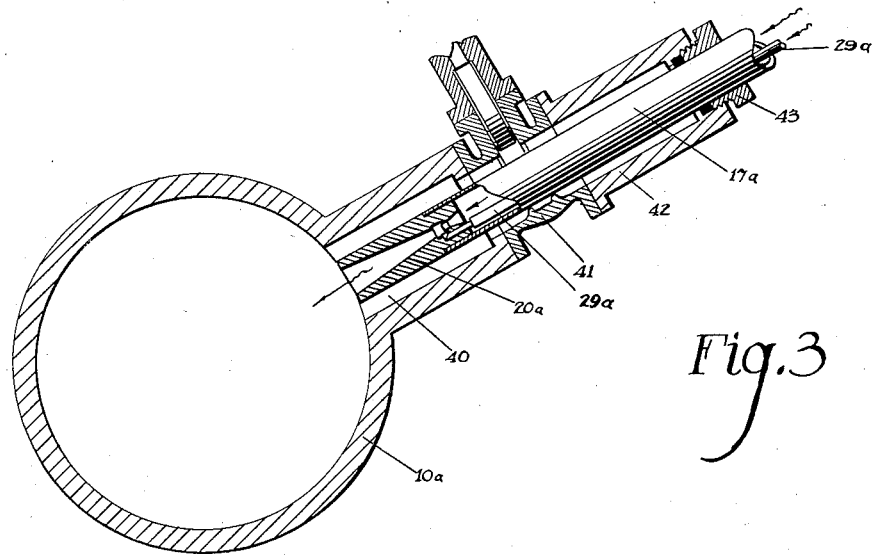
Fig. 3 is a view showing a modified arrangement of the injector.

Fig. 3 shows a construction in which the injector 20a is set in a small pocket or injector chamber 40 formed in the wall of a closed water main 10a. The casing of a valve 41 is connected to the outer end of the walls of the pocket 40, and a casing 42 is secured to the other side of the valve casing to provide a withdrawal chamber. The injector is carried by the water pipe 17a which extends through a stuffing box 43 at the outer end of the casing 42, the gas pipe 29a extending inside that portion of the water pipe which passes through the stuffing box. The injector may thus conveniently be withdrawn even while the pipe line 10a is under pressure by drawing the injector back past the valve into the chamber within the casing 42 and then closing the valve 41 and thereafter opening the stuffing box and further withdrawing the injector.

It will be noticed that in all the constructions illustrated the injector is set to discharge directly into the water flowing through the main flow conduit or channel. In Fig. 1 the injectors are submerged in the main flow of water, and in Fig. 3 the injector is set in a pocket directly adjacent to the flow line of the main flow, but in neither of the arrangements shown does the injector extend into the line of flow of the main flow, and it is an advantage of the invention that it does not involve any obstruction of the main flow.

In addition to the advantages of the method and apparatus of the present invention which have been referred to, it may be pointed out further that the disadvantages of chlorine hydrate formation and clogging of the diffuser equipment are entirely eliminated. All of the water and gas flow passages of the mixing and discharging device are relatively large and, therefore, not liable to clogging, and the formation of hydrate is avoided by reason of the fact that the chlorine gas does not contact with liquid until it reaches the injector throat and that such a state of turbulence then exists until the gas is shot out into and distributed in the main flow that before hydrate has a chance to form the solution is so diluted that the formation of hydrate is prevented. Hydrate forms only at relatively high concentrations.

The term "water" as used in the claims is to be understood as including all kinds of waters and watery liquids, such as water of city and town supplies, sewage, etc.

What is claimed is:

1. The method of treating flowing water, which comprises introducing a measured flow of chlorine gas into a minor flow of water, and immediately and forcibly discharging the minor flow and the entrained gas into the main flow of water to be treated, whereby the gas is diffused in the main flow substantially without loss of active chlorine through combination with impurities in the minor flow.

2. The method of treating flowing water, which comprises establishing a separate minor flow of water under pressure substantially greater than the pressure of the water to be treated, supplying a measured flow of chlorine gas, drawing the chlorine gas into the minor flow by suction created by the minor flow, and immediately discharging the minor flow and the entrained chlorine into the main flow of water to be treated, whereby the gas is diffused in the main flow substantially without loss of active chlorine through combination with impurities in the minor flow, the rate of supply of gas to the minor flow being controlled at a point distant from the place where the gas is sucked into the minor flow.

3. The method of treating flowing water, which comprises establishing a separate minor flow of water and forcibly discharging said minor flow into the main flow of water to be treated, permitting chlorine gas to flow from a container of liquefied chlorine, reducing the pressure of the gas and controlling its rate of flow at a point distant from the place of discharge of said minor flow into the main flow of water, introducing the controlled flow of gas into the minor flow of water at the place of discharge of the minor flow into the main flow, and immediately mixing the gas with the minor flow and discharging the minor flow with the gas distributed in a finely divided state therein into the main flow, whereby the gas is diffused in the main flow, substantially without loss of active chlorine through combination with impurities in the minor flow.

4. The combination with a conduit having a chamber therein extending upward therefrom, of apparatus for treating water flowing through the conduit, comprising a water pipe extending downward in a channel formed in the wall of said chamber, means for raising and lowering said pipe, means for supplying a minor flow of water under pressure connected to the upper end of said pipe, an injector carried at the lower end of said pipe and submerged in the water flowing through the conduit when the pipe is lowered to operating position, a gas tube extending downward in said channel and connected to the injector to supply gas thereto, and means for supplying gas at a controlled rate to the upper end of said tube, the injector being formed to mix gas drawn from said tube with the minor flow of water passing through the injector and discharge such water and the entrained gas immediately and forcibly into the water flowing through the conduit.

5. Apparatus for treating flowing water with chlorine gas, comprising in combination with a conduit for the water to be treated, a water pipe extending downward into the conduit when in its lowered position, means for raising and lowering said pipe, means for supplying a minor flow of water under pressure connected to the upper end of said pipe, an injector carried at the lower end of said pipe and submerged in the water flowing through the conduit when the pipe is lowered to operating position, a gas tube connected to the injector to supply gas thereto, and means for supplying chlorine gas at a controlled rate to said tube, the injector being formed to mix gas from said tube with the minor flow of water passing through the injector and discharge such water and the entrained gas immediately and forcibly into the water flowing through the conduit, whereby the gas is diffused in the main flow substantially without loss of active chlorine through combination with impurities in the minor flow.

JOHN C. BAKER.
GERALD D. PEET.